United States Patent [19]

Rado

[11] 4,199,552

[45] Apr. 22, 1980

[54] PROCESS FOR THE PRODUCTION OF SYNTHETIC RUTILE

[75] Inventor: Theodore A. Rado, Oklahoma City, Okla.

[73] Assignee: Kerr-McGee Corporation, Oklahoma City, Okla.

[21] Appl. No.: 910,051

[22] Filed: May 26, 1978

[51] Int. Cl.² ............................................. C01G 23/04
[52] U.S. Cl. ....................................... 423/83; 423/82; 423/86; 75/1 TI
[58] Field of Search ............................ 423/82, 86, 83; 75/1 TI

[56] References Cited

U.S. PATENT DOCUMENTS

| | | | |
|---|---|---|---|
| 2,339,808 | 1/1944 | Ravnestad et al. | 423/82 |
| 3,660,029 | 5/1972 | Naguib | 423/80 |
| 3,734,996 | 5/1973 | Bade et al. | 423/83 |
| 3,929,963 | 12/1975 | Kurata et al. | 423/86 |
| 4,038,364 | 7/1977 | Lailach | 423/86 |

FOREIGN PATENT DOCUMENTS 1477840  6/1977 United Kingdom ...................... 423/86

*Primary Examiner*—Herbert T. Carter
*Attorney, Agent, or Firm*—William G. Addison

[57] ABSTRACT

An improved process for the production of synthetic rutile from ore containing titanium and iron, such as ilmenite ore, by a multi-step procedure employing controlled reduction, controlled oxidation and acid leaching. More specifically, the ilmenite ore first is reduced thermally such that substantially all of the iron (III) present has been converted to iron (II) and some metallic iron. The reduced ore then is oxidized with an oxidizing gas substantially free of elemental oxygen to convert the metallic iron to iron (II) without the substantial formation of iron (III). The oxidized ore then is leached to remove the iron (II) and calcined to produce synthetic rutile. The synthetic rutile so produced contains in excess of 92 percent titanium dioxide and less than 2 percent iron (III), by weight. Often, the synthetic rutile contains less than 1 percent total iron by weight.

9 Claims, No Drawings

PROCESS FOR THE PRODUCTION OF SYNTHETIC RUTILE

Background of the Invention

1. Field of the Invention

This invention relates to a process for the production of synthetic rutile from an ore containing iron and titanium, such as, for example, ilmenite ore.

2. Description of the Prior Art

Processes for the production of synthetic rutile containing 90 percent and more titanium dioxide from ore such as ilmenite are becoming increasingly important. The synthetic rutile is used instead of natural rutile, of which only limited deposits remain, for the production of titanium tetrachloride. Titanium tetrachloride is the starting material for the production of titanium dioxide pigments by the so-called chloride process.

The direct chlorination of ilmenite is uneconomical because the ilmenite contains iron in quantities of from about 30 percent to about 50 percent which is converted into chloride. The amount of chlorine consumed by the iron is lost to the process or requires complicated measures for recovery.

In present commercial operations, ilmenite ore is reduced, acid leached and calcined to produce synthetic rutile. The extent of ore reduction is governed by the desire to convert as much of the iron (III) present in the ilmenite to iron (II) as possible, without the formation of metallic iron. The iron (II) is much easier to leach from the ilmenite ore than iron (III). The reduction process still results in the formation of small quantities of metallic iron due to localized over-reduction which can not be eliminated without a substantial reduction in iron (III) to iron (II) conversion. The localized over-reduction also reduces some of the titanium dioxide into lower oxides of titanium. These compounds are much more soluble in acidic solutions than titanium dioxide.

When the ore, containing the small amounts of metallic iron, is contacted with the acid leach solution, hydrogen gas is evolved. The gas evolution, if substantial, can produce safety and operating problems. Further, the increased solubility of some of the titanium compounds results in their dissolution in the leach solution. The dissolved titanium is lost to the process or requires complicated measures for recovery, thereby normally reducing the titanium dioxide content of the synthetic rutile.

Numerous processes have been developed which overcome some of these problems, however they are often complicated and less economical than is desirable.

In U.S. Pat. No. 2,339,808, one process for treating ferro-titaniferous materials is disclosed. That process comprises thermal reduction of the ferro-titaniferous ore to convert iron into a metallic state in a finely divided form. The reduced ore is cooled under non-oxidizing conditions and then the ore is oxidized with air and water at a temperature not in excess of 200 degrees C. to convert the metallic iron to iron oxides. The iron oxides then are removed from the ore by washing and decantation or by magnetic separation techniques.

In another process disclosed in U.S. Pat. No. 3,734,996, ilmenite is pre-oxidized and then reduced to convert iron oxide contained therein to iron. The reduced ore is treated with nitrobenzene at about 20 degrees C. to about 100 degrees C. and a pH of 3 to 7 to oxidize the iron to iron oxide pigment which can be separated by screen graders or hydrocyclones and leave a titaniferous concentrate. The concentrate then is acid leached, filtered and washed to remove residual iron impurities.

U.S. Pat. No. 4,038,364 discloses the production of synthetic rutile from a ferro-titaniferous ore by reducing most of the iron (III) in said ore into iron (II) without the formation of metallic iron. The reduction is accomplished using a gas containing hydrogen and steam and optionally containing CO and $CO_2$ as a reducing agent. The molar ratio of $H_2+CO$ to $H_2O+CO_2$ present ranges between 0.36 and 1.8.

It would be desirable to provide a simple, effective and economic process for producing synthetic rutile, substantially free of iron, from ilmenite ore for use in titanium dioxide chlorination processes.

Summary of the Invention

The discovery now has been made that ilmenite ore can be converted to a substantially iron free synthetic rutile by a multi-step procedure employing controlled reduction, controlled oxidation and acid leaching.

More specifically, the ilmenite ore first is reduced, for example, in a rotary kiln at a temperature of from about 700 degrees C. to about 1100 degrees C. to convert most of the iron (III) in the ore to iron (II) and some metallic iron. The reduced ore then is contacted with, for example, reduction flue gas containing essentially no free elemental oxygen to oxidize most of the metallic iron into iron (II) without the substantial re-formation of iron (III). Preferably, the reduction flue gas comprises the off-gas from the reduction of the ilmenite ore and consists of carbon dioxide and vaporous $H_2O$. The oxidized ore then is cooled to a temperature below which substantial further oxidation will not occur and mixed with a hydrochloric acid solution and leached to extract the iron compounds and leave a synthetic rutile containing 92 percent or more $TiO_2$ and less than 2 percent iron (II). Often, the synthetic rutile will contain less than 1 percent total iron, by weight.

Description of the Preferred Embodiment

In accordance with the process of the present invention, an ore containing titanium and iron, such as ilmenite ore, first is subjected to a thermal reduction. The reduction can be performed in a rotary kiln or in a stationary retort. If gases such as hydrogen, carbon monoxide or water gas and the like or liquids such as fuel oil and the like are used as reducing agents, the reduction proceeds fairly well at about 700 degrees C. to about 1000 degrees C. If solid reducing agents such as charcoal or coke are used, the temperature required to perform a satisfactory reduction may be somewhat higher. The preferable temperature is dependant upon the operating conditions and the quality of the ore.

The extent to which the iron content of the ilmenite ore should be reduced to the metallic state, is dependant upon the quantity of iron (III) which is to be removed. In most cases, the metallic iron will form from about 0.25 percent to about 4 percent by weight of the ore after reduction of substantially all the iron (III) has occurred.

In a preferred embodiment, ilmenite ore is admixed with approximately 2 percent to about 10 percent fuel oil by weight and introduced into a rotary kiln. The ilmenite-fuel oil mixture is heated within the rotary kiln to a temperature in the range of from about 950 degrees C. to about 1050 degrees C. for a period of time of from about 15 minutes to up to 2 hours. The specific time is dependant upon the quality of the ore being reduced.

The reduced ore, containing less than 2 percent iron (III), by weight, and preferably less than 0.5 percent iron (III), by weight, then is contacted in an oxidation zone with an oxidizing gas containing essentially no free elemental oxygen to oxidize the metallic iron formed during reduction to iron (II). Iron (II) can be removed from the ilmenite ore more easily and economically by leaching than can metallic iron or iron (III). The oxidation also effects a reoxidation of any reduced titanium compounds to titanium dioxide that may have been formed during the ore reduction. This increases the final titanium dioxide content of the synthetic rutile product as less of the titanium containing compounds now are dissolved upon subsequent acid leaching of the ore to remove the iron impurities contained therein. Any free elemental oxygen present in the oxidizing gas is undesireable since its presence causes, upon oxidation of the metallic iron, the formation of iron (III) instead of the preferred iron (II).

In the event that a small amount of free elemental oxygen is present, that is for example, if a small amount of air is present in the oxidizing gas, it is necessary that a slight amount of a reductant also be added to the oxidizing gas. The reductant can be any material capable of reducing iron (III) to iron (II) at the operating conditions of the process.

The oxidation reaction occurs rapidly at elevated temperatures and will proceed to complete conversion of metallic iron to iron (II) in from about 15 minutes to about 2 hours. However, longer times may be used, if desired. The actual time required, of course, is dependant upon the quantity of metallic iron that must be oxidized. Preferably, the temperature within the oxidation zone is in the range of from about 300 degrees C. to about 1100 degrees C.

In the preferred embodiment, the oxidizing gas is reduction flue gas and the oxidation reaction occurs within a terminal portion of the rotary kiln. The reduction flue gas, containing $CO_2$, $H_2O$ and some trace fuel oil vapor is recovered from the reducing portion of the rotary kiln and re-introduced into the end of the kiln to flow countercurrent to the advancing reduced ore. The traces of fuel oil vapor in the recycle flue gas provide the necessary reductant to reduce any iron (III) formed by reaction of the metallic iron with any free oxygen which may remain from the incomplete combustion of air and fuel oil in the reduction portion of the rotary kiln.

The oxidation section within the rotary kiln also provides the unexpected advantage of acting as a heat exchanger between the discharging ore and the recycle reduction flue gas. This effect advantageously lowers the temperature of the discharged ore while increasing the thermal efficiency of the rotary kiln and reducing fuel consumption in the reduction process.

The oxidized ore is removed from the rotary kiln and cooled to a temperature below which substantial further oxidation will not occur. The cooling can be effected by direct cooling, such as for example, water quenching of the oxidized ore wherein an ore slurry is produced for introduction into additional processing apparatus or by indirect heat exchange techniques.

The cooled ilmenite ore then is subjected to leaching with a hydrochloric acid solution to remove the iron (II). Preferably, the hydrochloric acid solution contains from about 17 percent to about 22 percent by weight hydrochloric acid, and preferably from about 18 percent to about 20 percent by weight hydrochloric acid. The leaching is performed at a temperature above about 80 degrees C. Preferably, the temperature is above about 105 degrees C. and the pressure is from about atmospheric to about 35 to about 50 psig. The specific pressure required depends upon the leaching temperature and should be sufficiently high to maintain the leaching solution in the liquid state. The time required for leaching can be from about 1 to about 6 hours. While longer times can be employed, the additional leaching which occurs is minimal.

In a preferred embodiment, the leaching is performed in a two stage process in which the hydrochloric acid solution is in an excess of from about 20 percent to about 50 percent of the quantity of acid stoichiometrically required to dissolve the acid soluble constituents of the ore. In the first stage, the ore is charged to a digester vessel with from about 45 percent to about 65 percent of the total acid solution. The acid solution is a fresh, nominal 20 percent by weight hydrochloric acid solution. The mixture is heated to a temperature of about 140 degrees C. and maintained at a pressure sufficient to retain the leaching solution in the liquid state for about 1 hour. The leach solution then is pumped out leaving the ore in the digester. The remaining fresh acid solution is introduced and leaching takes place as in the first stage.

While the preferred embodiment has been described as a two stage process, it also is possible to perform the leaching in a single stage or in three or more stages. Further, while the acid solution has been described as a fresh acid solution, it is possible to use a mixture of fresh acid solution and recycled second stage or other recycled leach liquor as the leaching solution in the first stage. Still further, in a continuous process wherein the spent hydrochloric acid is recovered from the leach liquors that are separated from the leached ore and regenerated, make-up acid containing 31.5 percent hydrochloric acid may by added to the regenerated acid solution to maintain the nominal 20 percent by weight hydrochloric acid concentration therein.

The leached ore after separation from the second stage leach liquor, is washed and calcined at a temperature of from about 600 degrees C. to about 1100 degrees C. to form synthetic rutile. The resulting synthetic rutile is a sand-like product containing in excess of 92 percent titanium dioxide and less than 2 percent iron (III), by weight.

The invention is best illustrated by the following Examples, which are set forth by way of illustration and not as limitations.

EXAMPLE I

Sand-like ilmenite ore containing 61.6 percent $TiO_2$, 3.2 percent FeO and 29.3 percent $Fe_2O_3$, by weight, was mixed with about 5 percent by weight of fuel oil and reduced at a temperature of about 927 degrees C. for about 1 hour. The reduced ore contained 0.34 percent metallic iron, 31.4 percent FeO and no $Fe_2O_3$. The reduced ore was oxidized with synthetic reduction flue gas containing 77 percent $N_2$, 11 percent $CO_2$, 9 percent $CH_4$ and 3 percent $H_2O$. No free oxygen was present in the reduction flue gas. The reduced ore was oxidized at a temperature of about 827 degrees C. for about 2 hours and then cooled to below 100 degrees C. The oxidized ore was leached in a two stage procedure at 143 degrees C. with 19.7 percent hydrochloric acid solution used in an excess of about 40 percent, based on the quantity stoichiometrically required for dissolving the acid soluble constituents of the ore. The oxidized ore was contacted with about 55 percent of the total hydrochloric acid solution in the first leaching stage for 3 hours and then cooled to below 100 degrees C. The first stage leach liquor was decanted and the ore was contacted with the remaining acid solution for an additional 3 hours in the second leaching stage at a temperature of 143 degrees C. The second stage leach liquor was decanted and the residue washed. The washed residue was calcined at 800 degrees C. for about 1 hour. The calcined ore contained 0.92 percent $Fe_2O_3$, less than 0.14 percent FeO and in excess of 92 percent $TiO_2$ by weight. The total iron present in the calcined ore was less than 0.65 percent by weight.

EXAMPLE 2

Ilmenite ore was mixed with about 5 percent by weight of fuel oil and reduced at a temperature of about 1000 degrees C. for about 1 hour. The reduced ore contained 2.9 percent metallic iron, 29.2 percent FeO and 0.14 percent $Fe_2O_3$, by weight. The reduced ore was oxidized with the synthetic flue gas at a temperature of about 827 degrees C. for about 8 hours and then cooled to below about 100 degrees C. The oxidized ore was leached as previously described, but with a 17.2 percent hydrochloric acid solution. The leached ore was washed and calcined as in Example 1. The calcined ore contained 0.80 percent $F_2O_3$, 0.22 percent FeO and in excess of 92 percent $TiO_2$, by weight. The total iron present in the calcined ore was less than 0.75 percent by weight.

The foregoing examples demonstrate the ability of the present invention to produce a synthetic rutile containing in excess of 92 percent titanium dioxide and less than 2 percent iron (III), by weight. Further, the synthetic rutile is found to contain less than 1 percent total iron, by weight.

While the present invention has been described with respect to what is at present considered to be the preferred embodiment thereof, it should be understood that changes or modifications can be made therein without departing from the spirit or scope thereof.

What is claimed is:

1. A process of improved thermal efficiency for the production of synthetic rutile from an ore containing titanium and iron, comprising:
   introducing said ore into a rotary kiln having a reduction region and an oxidation region;
   reducing said ore containing titanium and iron in said reduction region by heating said ore to a temperature in the range of from about 700 degrees C. to about 1100 degrees C. in the presence of a reducing agent such that the iron (III) present in the ore is substantially reduced to iron (II) and some metallic iron and a reduction flue gas is produced;
   recovering at least a portion of said reduction flue gas from said reduction region of said rotary kiln;
   introducing said recovered reduction flue gas into said oxidation region of said rotary kiln in such a manner that said reduction flue gas passes countercurrently to said reduced ore within said rotary kiln to cool said reduced ore by heat exchange and oxidize said reduced ore to convert metallic iron to iron (II) without the formation of significant amounts of iron (III);
   withdrawing the oxidized ore from the rotary kiln;
   leaching said oxidized ore with a hydrochloric acid solution to substantially remove the iron (II) and any remaining iron (III) present in the ore; and
   calcining the acid leached ore to produce synthetic rutile, the thermal efficiency of said rotary kiln having been increased by having passed said reduction flue gas countercurrently to said reduced ore in said oxidation region of said rotary kiln.

2. The process of claim 1 wherein the iron (III) in the ore is substantially reduced to iron (II) and some metallic iron defined further as:
   reducing the iron (III) in the ore such that less than 0.5 percent iron (III), by weight, remains in the ore after reduction is completed.

3. The process of claim 1 wherein metallic iron is formed by reduction of iron (III) defined further as reducing the iron (III) in the ore such that metallic iron now is present in the range of from about 0.25 to about 4.0 percent of the ore, by weight.

4. The process of claim 1 wherein the leaching is performed with a hydrochloric acid solution having a 17 percent to about 22 percent hydrochloric acid content, by weight.

5. The process of claim 1 wherein the leaching is performed with a hydrochloric acid solution having a hydrochloric acid content in the range of from about 18 percent to about 20 percent, by weight.

6. The process of claim 1 wherein ore containing titanium and iron is ilmenite.

7. The process of claim 1 wherein the synthetic rutile is defined further as containing in excess of 92 percent titanium dioxide and less than 2 percent iron (III), by weight.

8. The process, of claim 7 wherein the synthetic rutile contains less than 1 percent total iron, by weight.

9. The process of claim 1 wherein the calcining occurs at a temperature in the range of from about 600 degrees C. to about 1100 degrees C.

* * * * *